(12) United States Patent
Tramoni et al.

(10) Patent No.: US 11,595,081 B2
(45) Date of Patent: Feb. 28, 2023

(54) DETECTION OF NFC DEVICES

(71) Applicant: STMicroelectronics (Rousset) SAS, Rousset (FR)

(72) Inventors: Alexandre Tramoni, Le Beausset (FR); Nicolas Cordier, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 308 days.

(21) Appl. No.: 16/899,218

(22) Filed: Jun. 11, 2020

(65) Prior Publication Data

US 2020/0412413 A1  Dec. 31, 2020

(30) Foreign Application Priority Data

Jun. 25, 2019  (FR) ...................................... 1906907

(51) Int. Cl.
*H04B 5/00* (2006.01)
*G06K 19/07* (2006.01)
*H01Q 1/24* (2006.01)
*H01Q 1/52* (2006.01)
*H01Q 1/22* (2006.01)

(52) U.S. Cl.
CPC .................................. *H04B 5/0031* (2013.01)

(58) Field of Classification Search
None
See application file for complete search history.

(56) References Cited

U.S. PATENT DOCUMENTS

| 8,983,374 | B2 * | 3/2015 | Wiley | H04B 5/0031 |
| | | | | 455/41.1 |
| 9,270,337 | B2 * | 2/2016 | Zhu | H04B 5/02 |
| 9,553,637 | B2 * | 1/2017 | Yang | H04W 4/80 |
| 9,685,699 | B2 * | 6/2017 | Mahanfar | H01Q 1/241 |
| 9,800,294 | B2 * | 10/2017 | Roh | H04B 5/0081 |
| 9,853,677 | B2 * | 12/2017 | Tramoni | H04B 5/0025 |
| 10,068,217 | B1 * | 9/2018 | Gopalakrishnan | G06F 11/30 |
| 10,079,621 | B2 * | 9/2018 | Lee | H01Q 1/243 |
| 10,790,551 | B2 * | 9/2020 | Park | H02J 50/005 |
| 10,997,483 | B2 * | 5/2021 | Rizzo | H01Q 1/521 |
| 11,043,751 | B2 * | 6/2021 | Antonetti | H04W 4/80 |
| 2007/0222609 | A1 * | 9/2007 | Duron | G06K 7/0008 |
| | | | | 340/572.7 |
| 2012/0139358 | A1 * | 6/2012 | Teggatz | H02J 50/90 |
| | | | | 307/104 |
| 2012/0315844 | A1 | 12/2012 | Cox et al. | |
| 2014/0148095 | A1 | 5/2014 | Smith et al. | |
| 2014/0256270 | A1 | 9/2014 | Cho et al. | |
| 2016/0004894 | A1 | 1/2016 | Tanikawa et al. | |
| 2017/0288732 | A1 | 10/2017 | Moon et al. | |

(Continued)

FOREIGN PATENT DOCUMENTS

CN  102820911 A  12/2012
CN  104038254 A  9/2014

(Continued)

*Primary Examiner* — Tuan A Tran
(74) *Attorney, Agent, or Firm* — Slater Matsil, LLP

(57) ABSTRACT

A circuit for a communication device and a method for switching a communication device are disclosed. In an embodiment, a method includes activating at least one first antenna and at least one second antenna of a near-field communication (NFC) device for switching the NFC device between first field detection phases and second card detection phases.

20 Claims, 4 Drawing Sheets

(56) References Cited

U.S. PATENT DOCUMENTS

2019/0174239 A1* 6/2019 Niklaus ................ H04R 25/602
2020/0412413 A1   12/2020 Tramoni et al.

FOREIGN PATENT DOCUMENTS

| CN | 106656278 A | 5/2017 |
| CN | 212137673 U | 12/2020 |
| EP | 2683090 A2 | 1/2014 |
| EP | 3498348 A1 | 6/2019 |

* cited by examiner

DETECTION OF NFC DEVICES

CROSS-REFERENCE TO RELATED APPLICATIONS

This application claims priority to French Patent Application No. 1906907, filed on Jun. 25, 2019, which application is hereby incorporated herein by reference.

TECHNICAL FIELD

The present disclosure relates generally to electronic circuits, and more specifically to electromagnetic transponders. The present disclosure applies more particularly to electronic devices incorporating a near-field communication (NFC) circuit and in particular to the near-field detection of a device.

BACKGROUND

Electromagnetic transponder communication systems are increasingly common, in particular, since the development of near-field communication (NFC) technologies.

These systems use a radiofrequency electromagnetic field generated by a device (terminal or reader) to communicate with another device (card).

In recent systems, the same NFC device can, in turn, operate in card mode or in reader mode. This for example occurs in the case of a near-field communication between two mobile telephones, or between a mobile telephone and a mobile point of sale (mPOS).

It is therefore desirable to be able to configure the same NFC device sometimes in card mode and sometimes in reader mode, depending on the nature of the other device to be detected or depending on the type of communication to be established with this other device.

SUMMARY

Embodiments provide near-field detection processes for NFC devices.

One embodiment addresses all or some of the drawbacks of known NFC devices and their near-field detection system.

One embodiment provides a method for switching an NFC device between first field detection phases and second card detection phases, in which at least one first antenna and at least one second antenna of the NFC device are successively activated.

One embodiment provides a circuit for switching an NFC device between first field detection phases and second card detection phases, including at least one first antenna and at least one second antenna that are successively activated.

One embodiment provides an NFC device including a circuit as described and/or a finite state machine suitable for implementing the method as described.

One embodiment provides a computer program product including instructions for implementing the method as described.

According to one embodiment, the first antenna and the second antenna are alternatively activated from one detection phase to the other.

According to one embodiment, the first antenna and the second antenna are successively activated during a same detection phase.

According to one embodiment, the switching is done periodically.

According to one embodiment, the switching is done at a frequency of at least 1 Hz, preferably at a frequency of 3 Hz or 4 Hz.

According to one embodiment, a time interval separates the first phase from the second phase.

According to one embodiment one from among the first and second antennas is a contactless recharging antenna of the NFC device and the other from among the first and second antennas is a shared antenna for implementing GSM and NFC communications.

According to one embodiment the first antenna is connected to a first adaptation circuit and the second antenna is connected to a second adaptation circuit, wherein the first and second adaptation circuits are coupled to a multiplexer.

According to one embodiment, the multiplexer is controlled by a digital switching signal.

According to one embodiment, a router of the NFC device supplies the digital switching signal.

According to one embodiment, the switching is done when the NFC device is in low power mode.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radiofrequency signals and their interpretation has not been described in detail, the described embodiments and modes of implementation being compatible with the standard techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
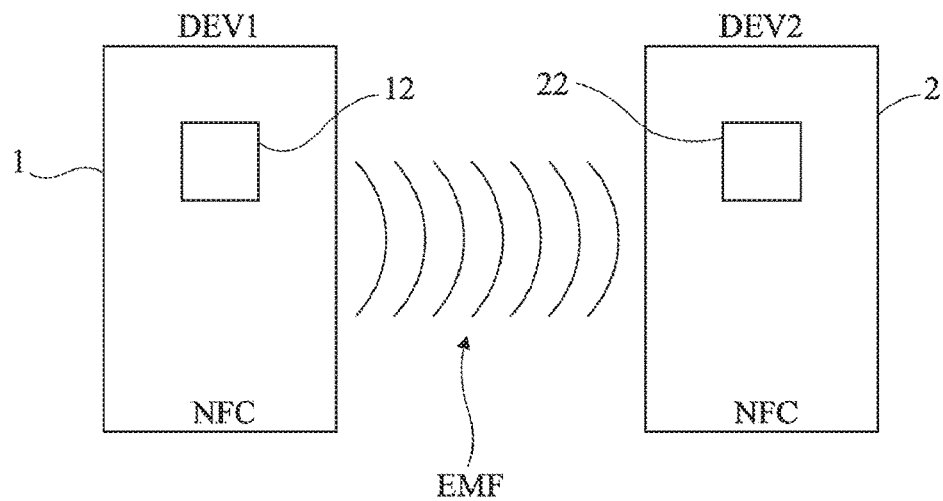
FIG. 1 shows, very schematically and in block diagram form, an exemplary near-field communication system, of the type to which, as an example, the described embodiments apply.

FIG. 1 shows, very schematically and in block diagram form, an exemplary near-field communication system, of the type to which, as an example, the described embodiments apply.

The case is considered of two similar electronic devices, for example two mobile telephones, but everything that will be described applies more generally to any system in which a reader, terminal or device, must detect and communicate with an electromagnetic transponder or an electronic tag. To simplify, reference will be made to NFC devices in order to designate electronic devices incorporating near-field communication circuits.

Two NFC devices 1 (DEV1) and 2 (DEV2) are able to communicate by near-field electromagnetic coupling. Depending on the applications, for a communication, one of the devices operates in so-called reader mode, while the other operates in so-called card mode, or both devices communicate in peer-to-peer (P2P) mode. Each device includes various electronic circuits 12 and 22 for generating and/or detecting a radiofrequency signal using an antenna (not shown). The radiofrequency field generated by one of the devices is detected by the other device, which is within range.

When a device (for example, the device 1) transmits an electromagnetic field (EMF) in order to initiate a communication with another NFC device (for example, the device 2), this field is detected by this device 2 once it is within range. The coupling between the two oscillating circuits (that of the antenna of the device 2 and that of the antenna of the device 1) is reflected by a variation of the charge made up of the circuits of the device 2 on the oscillating circuit for generating the field of the device 1. In practice, for a communication, the corresponding phase or magnitude variation of the transmitted field is detected by the device 1, which then begins an NFC communication protocol with the device 2. On the device 1 side, in practice it is detected whether the magnitude of the voltage across the terminals of the oscillating circuit and/or the phase shift relative to the signal generated by the circuit 12 depart from the magnitude and phase windows each defined by a lower threshold and an upper threshold.

In the case of a communication, once the device 1 has detected the presence of the device 2 in its field, it begins a procedure for establishing communication, implementing transmissions of the requests by the device 1 and responses by the device 2 (polling sequence as defined in the NFC Forum standard). If circuits of the device 2 are in standby mode, they are then reactivated.

For energy saving reasons, the transmitting device 1, whether it is connected to the electrical distribution sector or supplied directly or indirectly by battery, is placed in standby mode when it is not in use for communication. NFC devices are generally equipped with circuits for detecting another device located within their field in order to exit standby mode for communication purposes.

In certain applications, when an NFC device is not in the process of communicating, it is switched to so-called low power mode in order to reduce the consumed energy. This is in particular the case for battery-powered devices. In this low power mode, a device configured in reading mode executes a so-called tag detection or card detection mode and executes detection loops. The detection is similar to that done when the device is not in low power mode, but the difference is that, in normal mode, the transmission of the carrier is continuous and periodically includes polling frames whereas, in order to reduce consumption, the transmission of the field is done by periodic bursts and without polling frame when the device is in low power mode. The bursts have a significantly shorter duration (in a ratio of at least ten, preferably at least one hundred) than the duration of a polling request of a card in normal mode.

When it is in low power mode, an NFC device capable of operating both in reader mode and in card mode alternates between field emission phases and field detection phases. The field emission phases correspond to the emission of polling frames in order to detect the presence of a device in card mode within range. The field detection phases allow the device to detect the presence of a field emitted by another device in reader mode.

The near-field communication circuits are increasingly frequently integrated into devices having communication functions other than NFC. This is in particular the case for mobile telephones that incorporate mobile telephone circuits and functions and NFC circuits and functions, and most often also Wi-Fi, Bluetooth, etc. functions and circuits. Another example is laptop computers, which are capable of constituting NFC devices while having Wi-Fi, Bluetooth, etc. circuits and functions.

The described embodiments take advantage of the presence of several radiofrequency communication circuits and functions equipping NFC devices, and provide for the use of these various circuits in order to improve NFC communications. These embodiments in particular apply to devices provided with several antennas. In particular, the described embodiments use the example of devices equipped with one antenna dedicated to NFC communications and another antenna normally dedicated to another function, for example GSM or Wi-Fi communications. This avoids making the device more complex by equipping it with two antennas dedicated to NFC communications.

According to one embodiment, two antennas of the device can be used in card mode and in reader mode. This corresponds to a situation where the device alternately performs, without outside action, field detection phases and field emission phases on both of its two antennas.

According to another embodiment, it is provided to select an antenna automatically for operation in card mode different from the antenna used in reader mode. According to one preferred embodiment, advantage is taken of the presence, in the device, of an antenna dedicated to wireless charging of a battery of the device or a mobile Point Of Sale (mPOS) antenna. This makes it possible to use a sensitive antenna, for example the dedicated NFC communication antenna, for operation in card mode and to take advantage of the presence of a larger antenna for operation in reader mode in order to emit a field with more energy and to thus improve the range of the reader.

It may be considered to perform a manual switch from one antenna to the other, but this would require an action by a user. Furthermore, this would not make it possible to guarantee the detection of a card or a reader nearby, the device for example risking, when one wishes to detect a card located within range, being configured to receive a field instead of being configured to emit a field.

Figure 2:
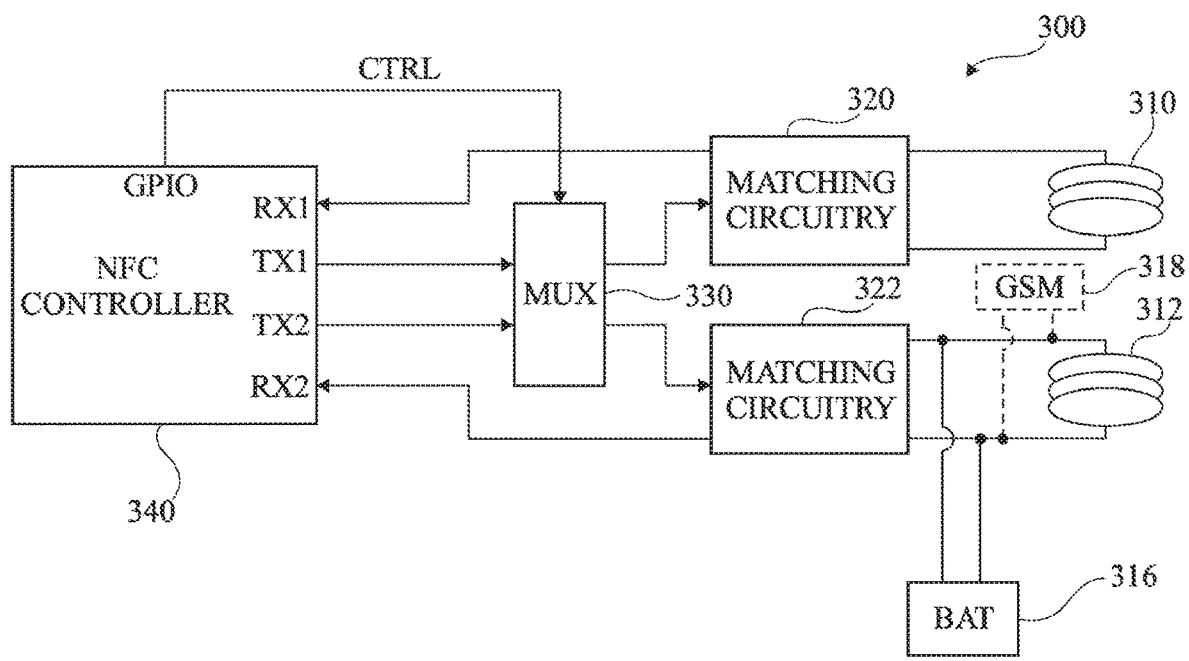
FIG. 2 shows, very schematically and in block diagram form, an embodiment of a near-field communication circuit.

FIG. 2 shows, very schematically and in block diagram form, an embodiment of a near-field communication circuit 300. This circuit 300 belongs to an NFC device able to be configured sometimes in card mode and sometimes in reader mode, for example the NFC device 1 of FIG. 1.

According to this embodiment, the near-field communication circuit 300 has a first antenna 310 and a second antenna 312. In the example of FIG. 2, the first antenna 310 is an antenna dedicated to NFC communications while the second antenna 312 is coupled to a battery 316 (BAT) powering the device 1. The second antenna 312 makes it possible, if applicable, to recharge the battery 316 of the device wirelessly.

In a variant, the second antenna 312 is an antenna dedicated to mobile telephone functions. This antenna is, for example, coupled to a wireless telephone module 318 (GSM) (shown in dotted lines, in FIG. 2).

In FIG. 2, the antennas 310 and 312 are further respectively coupled, preferably connected, to a first circuit 320 (MATCHING CIRCUITRY) for antenna adaptation and a second circuit 322 (MATCHING CIRCUITRY) for antenna adaptation. These circuits 320 and 322 are, for example, impedance adaptation devices making it possible to optimize the emission or the reception of NFC signals, at a frequency of 13.56 MHz, via the antennas 310 and 312.

The adaptation circuits 320 and 322 are both connected to a multiplexer 330 (MUX) and to an NFC controller 340 (NFC CONTROLLER) or NFC router. The multiplexer 330 here makes it possible to emit signals coming from the NFC controller 340 toward one or the other of the adaptation circuits 320 and 322, to which the antennas 310 and 312 are respectively connected. In other words, the multiplexer 330 makes it possible to switch, toward one or the other of the antennas 310 and 312, NFC signals to be sent by the NFC device 1 including the circuit 300.

In the example of FIG. 2:
a first output terminal (TX1) of the NFC controller 340 is coupled, preferably connected, to an input of the multiplexer 330;
a second output terminal (TX2) of the NFC controller 340 is coupled, preferably connected, to another input of the multiplexer 330;
an output of the multiplexer 330 is coupled, preferably connected, to an input of the first antenna adaptation circuit 320; and
another output of the multiplexer 330 is coupled, preferably connected, to an input of the second antenna adaptation circuit 322.

Signals captured (or received) by the first antenna 310 or by the second antenna 312 are, in this example, directly transmitted to the NFC controller 340, without going through the multiplexer 330. Thus, still in the example of FIG. 2:
a first input terminal (RX1) of the NFC controller 340 is coupled, preferably connected, to an output of the first antenna adaptation circuit 320; and
a second input terminal (RX2) of the NFC controller 340 is coupled, preferably connected, to an output of the second antenna adaptation circuit 322.

According to this embodiment, a General Purpose Input/Output port (GPIO) of the NFC controller 340 sends the multiplexer 330 a digital control signal (CTRL). The signal CTRL is preferably a binary signal, whereof, for example a high state (or high level) controls the activation, via the multiplexer 330, of one of the antennas, among the first antenna 310 and the second antenna 312, for the emission of signals and a low state (or low level) controls the activation, via the multiplexer 330, of the other antenna, among the first antenna 310 and the second antenna 312, for the emission of signals.

In other words, the high or low state of the signal CTRL allows the multiplexer 330 of the circuit 300 to switch, toward one or the other of the antennas 310 and 312, the NFC signals to be sent. The signal CTRL is in particular configured to activate one or the other of the two antennas 310 and 312 of the NFC device 1 during phases for detecting another NFC device (for example, the NFC device 2 of FIG. 1) located nearby.

According to one preferred embodiment, the signal CTRL is switched to its high state or its low state by a finite state machine of the NFC controller 340. Other generating modes of the signal CTRL may nevertheless be considered based on the targeted application. The signal CTRL can, for example, be generated by a wired logic circuit or by a computer program product executed by a dedicated microcontroller or, more generally, by any logic and/or programmed circuit capable of supplying the digital control signal CTRL of the multiplexer 330.

Figure 3:
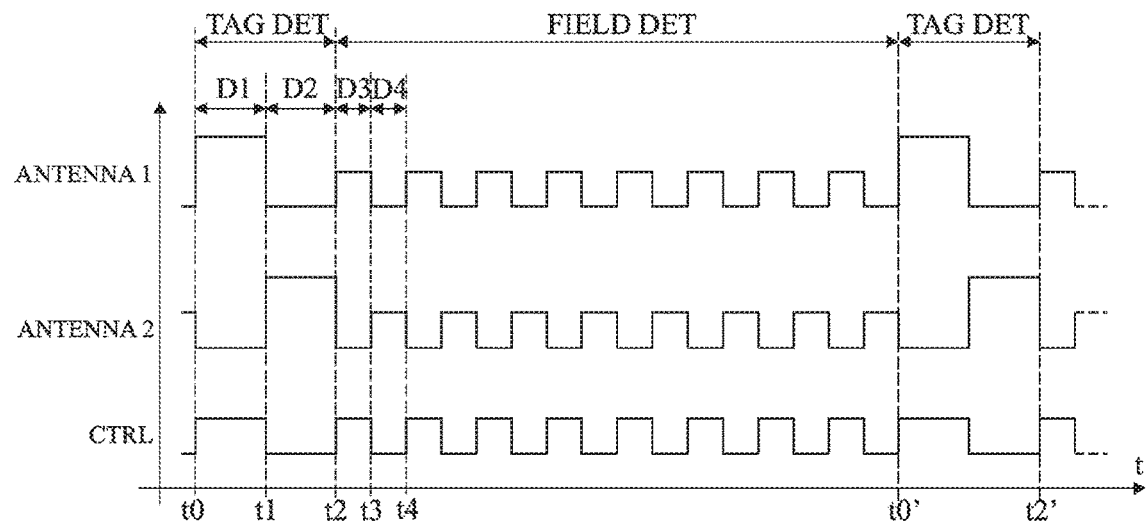
FIG. 3 illustrates, by timing diagrams, a mode of implementation of a method for controlling the circuit described in relation with FIG. 2.

FIG. 3 illustrates, by timing diagrams, a mode of implementation of a method for controlling the circuit 300 described in relation with FIG. 2. It is again assumed that the circuit 300 belongs to an NFC device, for example the NFC device 1 of FIG. 1.

FIG. 3 more specifically shows the appearance of:
a first activation signal (ANTENNA 1) of a first antenna, for example the first antenna 310 of the circuit 300 of FIG. 2;
a second activation signal (ANTENNA 2) of a second antenna, for example the second antenna 312 of the circuit 300 of FIG. 2; and
a third control signal (CTRL), for example the control signal CTRL of the multiplexer 330 of the circuit 300 of FIG. 2.

In FIG. 3, the card detection phases are shown with a higher amplitude than the field detection phases because the average consumption of the card detection function is greater than the average consumption of the field detection function. In reality, the signal CTRL is used to choose one or the other of the antennas, but also to launch a sequence (paced by the finite state machine) for field detection or card detection. For example, for the field detection phase, the majority of the time is used to start regulators and oscillators and a small portion of the card detection phase corresponds to the sending of bursts of the field and evaluating the phase and amplitude of the signal.

In this example, it is arbitrarily considered that a high state of the signal CTRL causes an activation of the first antenna 310 (signal ANTENNA 1 placed in the high state) and a deactivation of the second antenna 312 (signal ANTENNA 2 placed in the low state). It is also arbitrarily considered that a low state of the signal CTRL, conversely, causes an activation of the second antenna 312 (signal ANTENNA 2 placed in the high state) and a deactivation of the first antenna 310 (signal ANTENNA 1 placed in the low state).

The two antennas 310 and 312 are therefore activated in turn, that is to say, alternately. The antennas 310 and 312 are thus not activated at the same time.

At a moment t0, the signal CTRL is switched to the high state. This simultaneously causes the activation of the first antenna 310 and the deactivation of the second antenna 312.

At a moment t1, the signal CTRL is switched to the low state. This simultaneously causes the activation of the second antenna 312 and the deactivation of the first antenna 310.

At a moment t2, the signal CTRL is switched to the high state. This simultaneously causes the activation of the first antenna 310 and the deactivation of the second antenna 312.

At a moment t3, the signal CTRL is switched to the low state. This simultaneously causes the activation of the second antenna 312 and the deactivation of the first antenna 310.

At a moment t4, the signal CTRL is switched to the high state. This simultaneously causes the activation of the first antenna 310 and the deactivation of the second antenna 312.

The signal CTRL is next switched, periodically, between its low state and its high state until a moment t0'. Between the moments t4 and t0', it is assumed that:

after each switch to the high state, the signal CTRL remains in this high state for a duration D3 before being placed in the low state; and after each switch to the low state, the signal CTRL remains in this low state for a duration D4 before being placed in the high state.

From the moment t0', the signals CTRL, ANTENNA 1 and ANTENNA 2 of FIG. 3 continue to evolve in the same way as what was previously described in relation with the moments t0 to t0'. The appearance of the signals as described between the moments t0 and t0' is thus repeated periodically. A new card detection phase is thus repeated at the moment t0' and ends at a moment t2', then a new field detection phase begins at the moment t2' and so forth.

In FIG. 3:
D1 denotes a duration separating the moments t0 and t1;
D2 denotes a duration separating the moments t1 and t2;
D3 denotes a duration separating the moments t2 and t3; and
D4 denotes a duration separating the moments t3 and t4.

Between the moments t0 and t2, that is to say, in this example, during a duration equal to the sum of the durations D1 and D2, the circuit 300 is in a first phase (TAG DET) for card detection (Tag detection or Card detection). This first phase corresponds to a situation in which the device emits an electromagnetic field, alternately by its first antenna 310 and by its second antenna 312, in order to detect any card (or NFC receiver) located nearby. The device is therefore configured in reader mode during this card detection phase.

Between the moments t2 and t0', that is to say, in this example, during a duration equal to eight times the sum of the durations D3 and D4, the circuit 300 is in a second phase (FIELD DET) for field detection. The second phase corresponds to a situation in which the device seeks to receive an electromagnetic field, alternately by its first antenna 310 and by its second antenna 312, emitted by any reader (or NFC receiver) located nearby. The device is therefore configured in card mode during this field detection phase.

The card detection phase differs from the field detection phase primarily in that the antennas 310 and 312 emit an electromagnetic field during card detection phases while they do not emit any electromagnetic field during field detection phases. The active periods of the card mode (for example between the moments t2 and t3, for the first antenna) correspond to periods where the reception circuits are temporarily activated (leaving the low consumption mode).

According to one embodiment, the duration D1 is approximately equal, preferably equal, to the duration D2 and the duration D3 is approximately equal, preferably equal, to the duration D4. In other words, it is then considered that the antennas 310 and 312 are activated during substantially equal, preferably equal, durations during card detection phases. It is considered, in the same manner, that the antennas 310 and 312 are activated during substantially equal, preferably equal, durations during field detection phases.

The durations D1 and D2 that respectively follow each activation of the antennas 310 and 312 during card detection phases are preferably greater than the durations D3 and D4 that respectively follow each activation of the antennas 310 and 312 during field detection phases. The multiplexer 330 of the circuit 300 (FIG. 2) is then configured to interpret a duration D1 or D2 as a configuration instruction of the device in reader mode and a duration D3 or D4, shorter than the durations D1 and D2, as a configuration instruction of the device in card mode.

The NFC device is thus switched periodically, according to the variation frequency of the control signal CTRL, between the first card detection phases and the second field detection phases. During a same detection phase (card or field), the first antenna 310 and the second antenna 312 of the NFC device are alternately activated. This makes it possible to take advantage of the presence, in the NFC device, of two antennas 310 and 312 in order to optimize or improve the detection of another device located nearby by selecting, once the card or reader is detected, the antenna providing the best result.

The periodic switching between the card detection phases and the second detection phases is done at a frequency of at least 1 Hz, preferably at a frequency of 3 Hz or 4 Hz. This frequency is adjusted, for example, to allow a quick enough detection of a card or a reader placed near the NFC device. This frequency is for example adjusted to allow the NFC device to detect a card or a reader in less than a second. Good usage comfort (or a good user experience) is then guaranteed for this NFC device.

Figure 4:
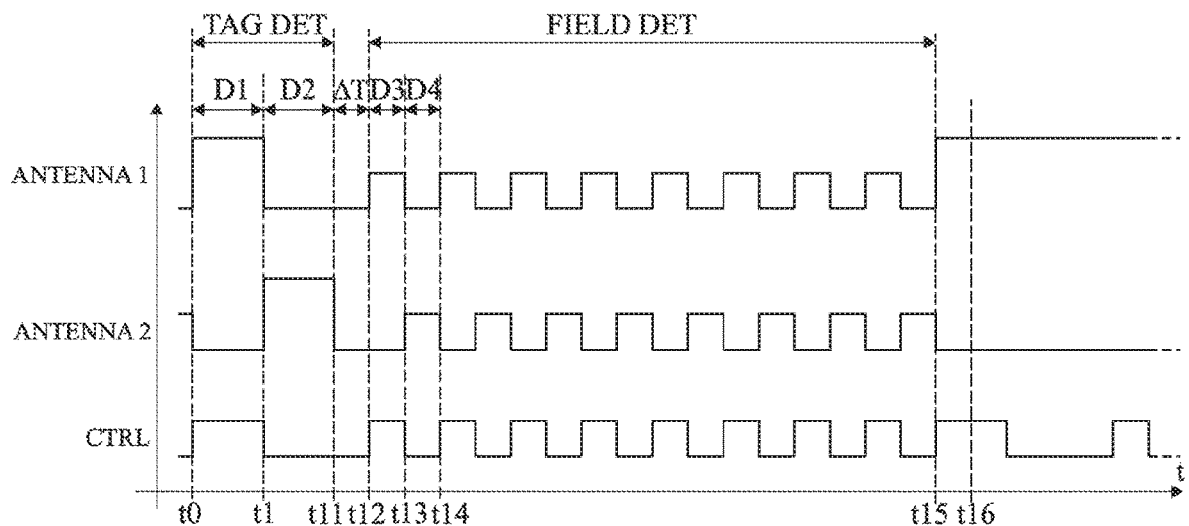
FIG. 4 illustrates, by timing diagrams, another mode of implementation of a method for controlling the circuit described in relation with FIG. 2.

FIG. 4 illustrates, by timing diagrams, another mode of implementation of a method for controlling the circuit 300 described in relation with FIG. 2.

The embodiment of FIG. 4 comprises like elements with the embodiment of FIG. 3. These like elements will not be described in detail again hereinafter.

The embodiment of FIG. 4 differs from that of FIG. 3 primarily in that the embodiment of FIG. 4 provides a time period or interval separating the card detection phase (TAG DET) from the field detection phase (FIELD DET). In FIG. 4, the card detection phase ends, at a moment t11, with the deactivation of the second antenna 312 (passage of the signal ANTENNA 2 from the high state to the low state). The field detection phase begins, at a moment t12, with the activation of the first antenna 310 (passage of the signal ANTENNA 1 from the low state to the high state). Thus, in the example of FIG. 4, the card detection phase is separated from the field detection phase by a duration ΔT (a time interval ΔT), separating the moments t11 and t12, during which neither of the two antennas 310 and 312 is activated.

According to one embodiment, the appearance of the signal CTRL is modified relative to the signal CTRL of FIG. 3. In the example of FIG. 4, the signal CTRL remains in the low state after the moment t11 (after the deactivation of the second antenna 312 during the card detection phase) during the duration ΔT. This duration ΔT is interpreted, by the circuits associated with the antennas 310 and 312, as a deactivation setpoint of these antennas 310, 312.

When an antenna, for example the antenna 312, is activated during a card detection phase, this antenna 312 emits, as disclosed in relation with FIG. 1, an electromagnetic field. When this same antenna 312 is deactivated, this electromagnetic field does not disappear instantaneously. In other words, the intensity of the electromagnetic field emitted by the antenna 312 lessens (or decreases) gradually after the deactivation of this antenna 312. A residual or remanent electromagnetic field therefore remains in the antenna 312 after it is deactivated. The decrease in the intensity of this residual field after deactivation of the antenna 312 can, in some cases, be slow enough for a resonance phenomenon to disrupt or interfere with the antenna 310.

According to one embodiment, another time interval ΔT' (not shown) separates other activation and deactivation operations of the antennas 310 and 312. This other time interval ΔT' for example separates the deactivation of the first antenna 310 from the activation of the second antenna 312 during a card detection phase (that is to say, between the durations D1 and D2, in FIG. 4). The duration of the time interval ΔT' is, preferably, equal to that of the time interval ΔT.

According to one embodiment, a time interval ΔT or ΔT' follows each deactivation operation of the antennas 310 and 312. In other words, a time interval ΔT or ΔT' precedes each activation operation of the antennas 310 and 312.

Hereinafter, it is assumed that only a period ΔT separates the card detection phases from the field detection phases, as illustrated in FIG. 4.

One advantage of the presence of the period ΔT is that this makes it possible to wait for the residual electromagnetic field, emitted by the antenna 312 after it is deactivated, to be weak enough to prevent such a phenomenon from occurring during the activation of the antenna 310 during the following field detection phase. Depending on the considered application, the period ΔT is therefore adjusted in order to prevent such disruptions.

According to one embodiment, the period ΔT is approximately from 0.1 μs to 1 μs, preferably about 1 μs.

At a moment t13, the signal CTRL is switched to the low state. This simultaneously causes the activation of the second antenna 312 and the deactivation of the first antenna 310.

At a moment t14, the signal CTRL is switched to the high state. This simultaneously causes the activation of the first antenna 310 and the deactivation of the second antenna 312.

The signal CTRL is next switched several times between its low state and its high state until a moment t15, marking the end of the field detection phase.

In the example of FIG. 4, it is assumed that a card (or a device in card mode) is detected by the antenna 310 of the device at a moment t16. Communication is thus established between the device and the card, by means of the antenna 310 and its associated circuits. From this moment t16, the device then leaves low power mode and thus begins to emit an electromagnetic field continuously. This is reflected, in FIG. 4, by the fact that the signal ANTENNA 1 remains in the high state until the end of the communication while the signal ANTENNA 2 is kept in the low state during this same communication.

Conversely, if, during a field detection phase, a reader is detected (a field is captured by one of the antennas), the corresponding detection circuits are activated continuously in order to establish a communication with the reader. In the case where a field is captured by the second antenna, the signal ANTENNA 2 remains at the high level and the signal ANTENNA 1 remains at the low level during the communication.

Figure 5:
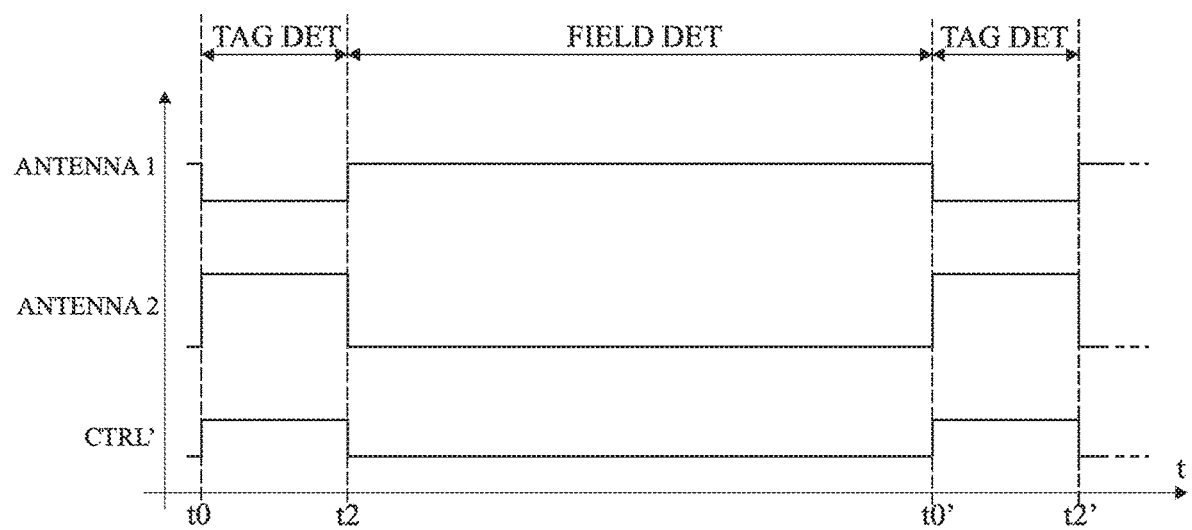
FIG. 5 illustrates, by timing diagrams, yet another mode of implementation of a method for controlling the circuit described in relation with FIG. 2.

FIG. 5 illustrates, by timing diagrams, still another mode of implementation of a method for controlling the circuit 300 described in relation with FIG. 2.

In this mode of implementation, FIG. 5 more specifically shows the appearance of:

the first activation signal (ANTENNA 1) of the first antenna 310 of the circuit 300 of FIG. 2;

the second activation signal (ANTENNA 2) of the second antenna 312 of the circuit 300 of FIG. 2; and a third control signal (CTRL') of the multiplexer 330 of the circuit 300 of FIG. 2.

In this example, it is arbitrarily considered that a high state of the signal CTRL' causes an activation of the second antenna 312 (signal ANTENNA 2 placed in the high state) and a deactivation of the first antenna 310 (signal ANTENNA 1 placed in the low state). It is also arbitrarily considered that a low state of the signal CTRL, conversely, causes an activation of the first antenna 310 (signal ANTENNA 1 placed in the high state) and a deactivation of the second antenna 312 (signal ANTENNA 2 placed in the low state).

It is further assumed, still in this example, that the first antenna 310 is selected for (dedicated to) detection in card mode while the second antenna 312 is selected for (dedicated to) detection in reader mode. This for example corresponds to the case of a device equipped with a first antenna 310 dedicated to NFC communications and a second antenna 312 used for wireless recharging of the device or for mobile telephone functions, as disclosed in relation with FIG. 1.

The two antennas 310 and 312 are therefore activated in turn, that is to say, alternately, from one detection phase to another. In the example of FIG. 5, only the antenna 310 is activated during the field detection phases, while only the antenna 312 is activated during the card detection phases. In the example of FIG. 5, a high state of the signal CTRL' thus corresponds to a card detection phase, while a low state of the signal CTRL' corresponds to a field detection phase.

At a moment t0, the signal CTRL' is switched to the high state. This simultaneously causes the activation of the second antenna 312 and the deactivation of the first antenna 310. The moment t0 thus marks the beginning of the card detection phase (TAG DET) using the second antenna 312.

At a moment t2, the signal CTRL' is switched to the low state. This simultaneously causes the activation of the first antenna 310 and the deactivation of the second antenna 312. The moment t2 thus marks the end of the card detection phase using the second antenna 312 and the beginning of the field detection phase (FIELD DET) using the first antenna 310.

At a moment t0', the signal CTRL' is switched to the high state. This simultaneously causes the activation of the second antenna 312 and the deactivation of the first antenna 310. The moment t0' thus marks the end of the field detection phase using the first antenna 310 and the beginning of a new card detection phase using the second antenna 312.

At a moment t2', the signal CTRL' is switched to the high state. This simultaneously causes the activation of the second antenna 312 and the deactivation of the first antenna 310. The moment t2' thus marks the end of the card detection phase and the beginning of a new field detection phase.

From the moment t0', the signals CTRL, ANTENNA 1 and ANTENNA 2 of FIG. 5 continue to evolve in the same way as what was previously described in relation with the moments t0 to t0'. The appearance of the signals as described between the moments t0 and t0' is thus repeated periodically.

It should be noted that the embodiment of FIG. 5 can be adapted to introduce a period before each activation of the antenna 310 (which is equivalent to providing a period after each deactivation of the antenna 312) in order to avoid any disruptions. This adaptation is within the reach of those skilled in the art from the indications provided in relation with FIGS. 3 and 4 above.

The embodiments previously described in relation with FIGS. 3 to 5 can further be combined or extended. In the case of a device including more than two antennas (for example, a device including three antennas) able to be used for NFC communications, it is in particular possible to provide an embodiment in which all of the antennas are successively activated during each field detection phase and successively activated during each card detection phase.

It is also possible to provide another embodiment in which one or several antennas of the device are allocated to the card detection phases, these antennas then being activated successively during a same card detection phase, while one or several other antennas are allocated to the field detection phases, these other antennas then being activated successively during a same field detection phase. The antennas allocated to the field detection phases can be identical to or different from the antennas allocated to the card detection phases.

These embodiments derived from the combination or adaptation of the embodiments described in relation with FIGS. 3 to 5 are within the reach of those skilled in the art from the indications provided above.

Figure 6:
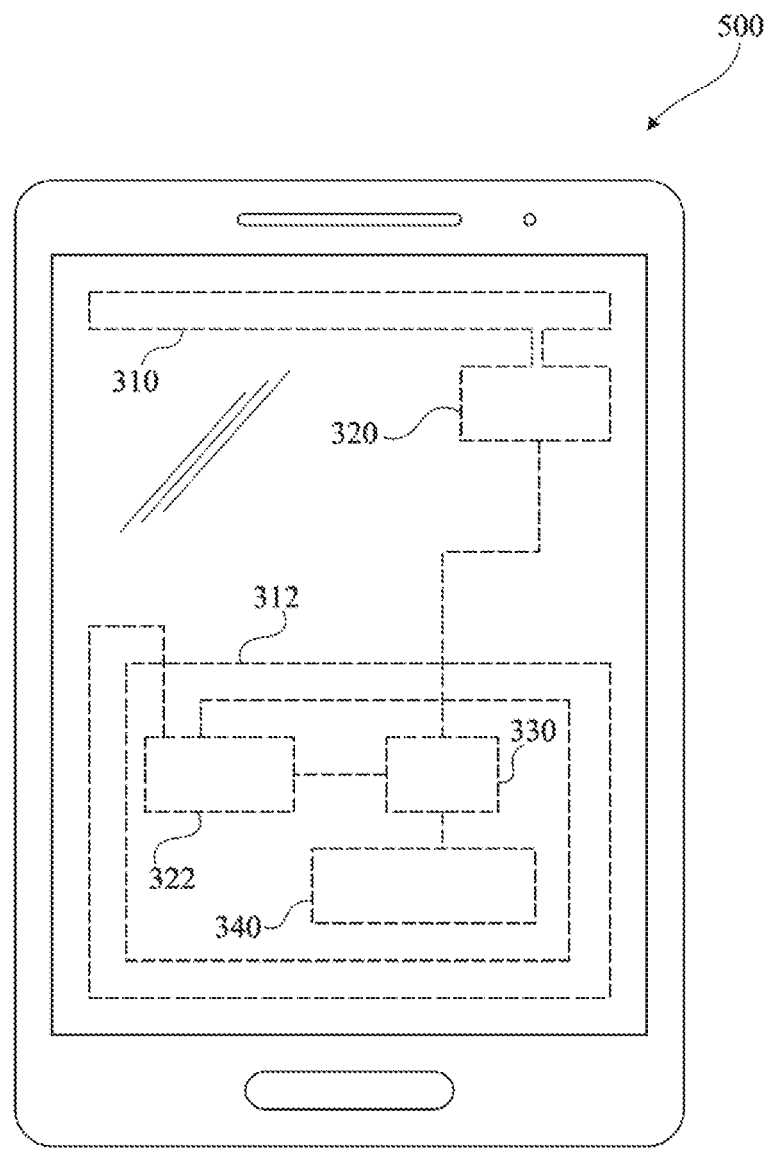
FIG. 6 shows, very schematically and in block diagram form, an exemplary mobile telephone including a near-field detection circuit of the type described in relation with FIG. 2.

FIG. 6 shows, very schematically and in block diagram form, an exemplary mobile telephone including a near-field detection circuit of the type of the circuit 300 described in relation with FIG. 2.

FIG. 6 more specifically illustrates an example integration of elements of the circuit 300 of FIG. 2 within a mobile telephone 500. Thus, in the example of FIG. 6, the mobile telephone 500 includes elements similar to those of the circuit 300 of FIG. 2 (in FIG. 6, these elements are shown in dotted lines). These elements can nevertheless, in the example integration illustrated in FIG. 6, be coupled by links shown differently relative to FIG. 2.

In the case of the mobile telephone 500 as illustrated in FIG. 6:

the first antenna 310 is, for example, an antenna dedicated to NFC communications or a shared antenna for NFC communications and for GSM communications; and the second antenna 312 is, for example, a wireless charging antenna, by induction, for a battery (not shown in FIG. 6) of the telephone 500.

The telephone 500 includes the multiplexer 330, controlled by the NFC controller 340 and respectively connected to the adaptation circuits 320 and 322 of the antennas 310 and 312. This for example makes it possible for the telephone 500 to switch automatically, that is to say, without action by a user, between the card detection phases and the field detection phases, the two antennas 310 and 312 of this telephone 500 being activated alternately during a same phase.

Various embodiments and modes of implementation have been described. Those skilled in the art will understand that certain features of these embodiments can be combined and other variants will readily occur to those skilled in the art. In particular, what is disclosed more particularly in relation with an exemplary application to a detection of a card or a reader by a mobile telephone applies more generally to a detection of a card or a reader by any type of NFC equipment able to implemented these two detection modes.

Finally, the practical implementation of the embodiments and variants described herein is within the capabilities of those skilled in the art based on the functional description provided hereinabove. In particular, the many alternations between the two antennas, during card detection phases, and field detection phases, can be modified based on the application.

What is claimed is:

1. A method comprising:
activating at least one first antenna and at least one second antenna of a near-field communication (NFC) device for switching the NFC device between first field detection phases and second card detection phases, the activating comprising successfully activating the first antenna and the second antenna during the same detection phase.

2. The method according to claim 1, wherein activating the at least one first antenna and the at least one second antenna comprises alternatively activating the first antenna and the second antenna from one detection phase to another detection phase.

3. The method according to claim 1, wherein switching comprises periodically switching.

4. The method according to claim 1, wherein switching comprises switching at a frequency of at least 1 Hz.

5. The method according to claim 1, wherein a time interval separates a first phase from a second phase.

6. The method according to claim 1, wherein one of the first antenna or the second antenna is a contactless recharging antenna, and wherein another one of the first antenna or the second antenna is a shared antenna configured to transmit or receive GSM and NFC communications.

7. A computer-program product to be stored in a non-transitory computer readable storage medium for execution by a processor, the program product including instructions according to claim 1.

8. A circuit for a near-field communication (NFC) device comprising:
at least one first antenna; and
at least one second antenna,
wherein the at least one first antenna and the at least one second antenna are configured to be successively activated for periodically switching the NFC device between first field detection phases and second card detection phases.

9. The circuit of claim 8, wherein the switching comprises switching at a frequency of at least 1 Hz.

10. The circuit of claim 8, wherein one of the first antenna or the second antenna is a contactless recharging antenna, and wherein another one of the first antenna or the second antenna is a shared antenna configured to transmit or receive GSM and NFC communications.

11. A circuit for a near-field communication (NFC) device comprising:
a NFC controller;
a multiplexer;
a first antenna adaption circuit;
a second antenna adaption circuit;
a first antenna connected to the first antenna adaption circuit; and
a second antenna connected to the second antenna adaption circuit,
wherein a first output terminal of the NFC controller is coupled to a first input of the multiplexer, wherein a second output terminal of the NFC controller is coupled to a second input of the multiplexer, wherein a first output of the multiplexer is coupled to an input of the first antenna adaptation circuit, wherein a second output of the multiplexer is coupled to an input of the second antenna adaptation circuit, wherein an output of the first antenna adaption circuit is connected to a first input of the NFC controller bypassing the multiplexer, wherein an output of the second antenna adaption circuit is connected to a second input of the NFC controller bypassing the multiplexer, and wherein the first antenna and the second antenna are configured to be successively activated for switching the NFC device between first field detection phases and second card detection phases.

12. The circuit according to claim 11, wherein the first antenna and the second antenna are configured to be alternatively activated from one detection phase to another detection phase.

13. The circuit according to claim 11, wherein the first antenna and the second antenna are configured to successively activated during the same detection phase.

14. The circuit according to claim 11, wherein the NFC device is configured to be switched periodically.

15. The circuit according to claim 11, wherein the NFC device is configured to be switched periodically at a frequency of at least 1 Hz.

16. The circuit according to claim 11, wherein a time interval ($\Delta T$) separates a first phase from a second phase.

17. The circuit according to claim 11, wherein the first antenna is a contactless recharging antenna of the NFC device, and wherein the second antenna is a shared antenna configured to transmit or receive GSM and NFC communications.

18. The circuit according to claim 11, wherein the multiplexer is controllable by a digital switching signal.

19. The circuit according to claim 18, wherein the NFC controller is configured to provide the digital switching signal.

20. The circuit according to claim 11, wherein the circuit is configured to switch the NFC device at low power mode.

* * * * *